United States Patent
Imai et al.

(10) Patent No.: US 11,353,678 B2
(45) Date of Patent: Jun. 7, 2022

(54) IMAGE-CAPTURING APPARATUS

(71) Applicant: Sony Corporation, Tokyo (JP)

(72) Inventors: Satoshi Imai, Kanagawa (JP); Kazuki Sakae, Tokyo (JP); Takashi Warashina, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 105 days.

(21) Appl. No.: 16/762,512

(22) PCT Filed: Nov. 6, 2018

(86) PCT No.: PCT/JP2018/041118
§ 371 (c)(1),
(2) Date: May 8, 2020

(87) PCT Pub. No.: WO2019/098085
PCT Pub. Date: May 23, 2019

(65) Prior Publication Data
US 2021/0191064 A1      Jun. 24, 2021

(30) Foreign Application Priority Data
Nov. 15, 2017   (JP) .............................. JP2017-219744

(51) Int. Cl.
*G02B 7/02* (2021.01)
*G03B 30/00* (2021.01)
(Continued)

(52) U.S. Cl.
CPC ............. *G02B 7/028* (2013.01); *G02B 7/025* (2013.01); *G03B 17/02* (2013.01); *G03B 30/00* (2021.01);
(Continued)

(58) Field of Classification Search
CPC .............................. G02B 7/028; G02B 7/025
See application file for complete search history.

(56) References Cited

U.S. PATENT DOCUMENTS

2010/0302658 A1*  12/2010  Watanabe .............. G02B 7/025
                                                        359/826
2014/0029076 A1   1/2014   Kato et al.
(Continued)

FOREIGN PATENT DOCUMENTS

CN        101859012 A       10/2010
DE   10 2014 113 73 B3      1/2016
(Continued)

OTHER PUBLICATIONS

International Search Report and Written Opinion dated Dec. 11, 2018 for PCT/JP2018/041118 filed on Nov. 6, 2018, 8 pages including English Translation of the International Search Report.
(Continued)

*Primary Examiner* — Cara E Rakowski
(74) *Attorney, Agent, or Firm* — Xsensus LLP

(57) ABSTRACT

An image-capturing apparatus according to an embodiment of the present technology includes a base plate, a base body, a lens holding section, and a first bonding material. An imaging element is implemented on the base plate. The base body includes a first surface portion arranged to be oriented toward the base plate, and is connected to the base plate. The lens holding section includes a second surface portion spaced from the first surface portion, and holds a lens section that forms an image of light that enters the lens section. The first bonding material is filled into a space between the first surface portion and the second surface portion to connect the base body and the lens holding section.

15 Claims, 10 Drawing Sheets

(51) Int. Cl.
    *H04N 5/225*      (2006.01)
    *G03B 17/02*      (2021.01)
(52) U.S. Cl.
    CPC .......... *H04N 5/225* (2013.01); *H04N 5/2254* (2013.01); *H04N 5/2253* (2013.01)

(56) References Cited

U.S. PATENT DOCUMENTS

| | | |
|---|---|---|
| 2015/0338602 A1 | 11/2015 | Furutake |
| 2015/0343885 A1* | 12/2015 | Zmek .................... G02B 7/028 296/146.15 |
| 2016/0097912 A1* | 4/2016 | Kobori .................. G02B 7/025 359/820 |
| 2016/0161701 A1 | 6/2016 | Takama et al. |
| 2018/0042106 A1* | 2/2018 | Scheja ................ H05K 1/0271 |

FOREIGN PATENT DOCUMENTS

| | | |
|---|---|---|
| DE | 10 2015 213 978 A1 | 6/2016 |
| JP | 2002-014269 A | 1/2002 |
| JP | 2014170124 A | 9/2014 |
| JP | 2015-219437 A | 12/2015 |
| WO | 2011/076634 A1 | 6/2011 |
| WO | 2014/167994 A1 | 10/2014 |

OTHER PUBLICATIONS

Extended European Search Report dated Nov. 18, 2020, in corresponding European Patent Application No. 18877856.7.

* cited by examiner

IMAGE-CAPTURING APPARATUS

CROSS-REFERENCE TO RELATED APPLICATIONS

The present application is based on PCT filing PCT/JP2018/041118, filed Nov. 6, 2018, which claims priority to JP 2017-219744, filed Nov. 15, 2017, the entire contents of each are incorporated herein by reference.

TECHNICAL FIELD

The present technology relates to an image-capturing apparatus that uses a lens and an imaging element.

BACKGROUND ART

In the past, an image-capturing apparatus has been developed that includes a lens and an imaging element in an integrated manner. For example, positions of a lens, an imaging element, and the like are adjusted in advance when such an image-capturing apparatus is assembled. Then, the positions of the lens, the imaging element, and the like are fixed in the state of the lens being in focus.

For example, Patent Literature 1 discloses an optical apparatus in which a position of a lens is fixed. In the optical apparatus disclosed in Patent Literature 1, a base is provided to a base plate on which an optical functional element such as a charge coupled device (CCD) is implemented. One end of a holder in which a cylindrical lens tube is accommodated is mounted on the base. Further, a lens is incorporated into one end situated on the functional-element side of the lens tube. Another end of the holder that is situated on a side opposite to the side of the base, and another end of the lens tube that is situated on a side opposite to the side of the lens are threaded, and the position of the lens is fixed by the lens tube being screwed into the holder. This makes it possible to prevent a positional shift of the lens by the thermal expansion and contraction of the holder and the thermal expansion and contraction of the lens tube being canceled, even when there is a change in the temperature in the environment in which the optical apparatus is used (for example, paragraphs [0012] to [0014], [0018], and [0022] of the specification and FIG. 1 in Patent Literature 1).

CITATION LIST

Patent Literature

Patent Literature 1: Japanese Patent Application Laid-open No. 2002-14269

DISCLOSURE OF INVENTION

Technical Problem

A technology has been desired that makes it possible to suppress a decrease in an image quality due to a change in temperature and to capture a high-quality image by preventing, for example, a positional shift of a lens that is caused due to a change in the temperature in the usage environment, as described above.

In view of the circumstances described above, it is an object of the present technology to provide an image-capturing apparatus that is capable of suppressing a decrease in an image quality due to a change in temperature and capturing a high-quality image.

Solution to Problem

In order to achieve the object described above, an image-capturing apparatus according to an embodiment of the present technology includes a base plate, a base body, a lens holding section, and a first bonding material.

An imaging element is implemented on the base plate.

The base body includes a first surface portion arranged to be oriented toward the base plate, and is connected to the base plate.

The lens holding section includes a second surface portion spaced from the first surface portion, and holds a lens section that forms an image of light that enters the lens section.

The first bonding material is filled into a space between the first surface portion and the second surface portion to connect the base body and the lens holding section.

In the image-capturing apparatus, the first surface portion of the base body connected to the base plate and the second surface portion of the lens holding section that holds the lens unit are spaced from each other. Then, the first bonding material is filled into a space between the first surface portion and the second surface portion so that the base body and the lens holding section are connected to each other. Accordingly, even if there is a change in temperature, it is possible to suppress an impact of the thermal expansion and contraction of, for example, the base body using the thermal expansion and contraction of the first bonding material. Consequently, it becomes possible to suppress a decrease in an image quality due to the change in temperature and to capture a high-quality image.

A coefficient of linear expansion of the first bonding material may be set such that an amount of shift of an image-formation position is nearly zero, the shift of the image-formation position being caused due to a change in temperature, the image-formation position being a position at which an image of the light that enters the lens section is formed.

This makes it possible to prevent an image-formation position from being shifted due to a change in temperature. Consequently, it becomes possible to suppress a decrease in an image quality due to the change in temperature and to capture a high-quality image.

A coefficient of linear expansion of the first bonding material may be set according to a distance from the first surface portion to the second surface portion.

This makes it possible to control an amount of thermal expansion and contraction of the first bonding material due to a change in temperature. Consequently, it becomes possible to sufficiently suppress, for example, an impact of thermal expansion and contraction due to the change in temperature.

A distance from the first surface portion to the second surface portion may be set such that an amount of shift of an image-formation position is nearly zero, the shift of the image-formation position being caused due to a change in temperature, the image-formation position being a position at which an image of the light that enters the lens section is formed.

This makes it possible to prevent an image-formation position from being shifted due to a change in temperature. Consequently, it becomes possible to suppress a decrease in an image quality due to the change in temperature and to capture a high-quality image.

A distance from the first surface portion to the second surface portion may be set according to a coefficient of linear expansion of the first bonding material.

This makes it possible to control an amount of thermal expansion and contraction of the first bonding material due to a change in temperature. Consequently, it becomes possible to sufficiently suppress, for example, an impact of thermal expansion and contraction due to the change in temperature.

A coefficient of linear expansion of the first bonding material and a distance from the first surface portion to the second surface portion may be set according to an amount of thermal expansion and contraction of the base body and an amount of thermal expansion and contraction of the lens holding section.

It becomes possible to suppress, for example, an impact due to the thermal expansion and contraction of the base body and the thermal expansion and contraction of the lens holding section that are caused due to a change in temperature, and to capture a sufficiently-high-quality image.

A coefficient of linear expansion of the first bonding material and a distance from the first surface portion to the second surface portion may be set according to a change in a focal length of the lens section, the change in the focal length of the lens section being caused due to a change in temperature.

It becomes possible to suppress, for example, an impact due to a change in a focal length of the lens unit, the change in the focal length of the lens unit being caused due to a change in temperature, and to capture a sufficiently-high-quality image.

The base body may be spaced from the base plate. In this case, the image-capturing apparatus may further include a second bonding material that is filled into a space between the base plate and the base body to connect the base plate and the base body.

The base body and the base plate are spaced from each other to be connected to each other using the second bonding material. This makes it possible to adjust the position, the pose, and the like of the base body with respect to the base plate with a high degree of accuracy.

The second bonding material may connect the base plate and the base body such that the lens section is able to form an image of a subject on the imaging element, the subject being situated a specified distance away from the imaging element.

This results in accurately forming an image of the subject on the imaging element. Consequently, it is possible to capture a sufficiently-high-quality image.

A coefficient of linear expansion of the first bonding material and a distance from the first surface portion to the second surface portion may be set according to a coefficient of linear expansion of the second bonding material.

This makes it possible to prevent, for example, the occurrence of a change in image-formation position due to the thermal expansion and contraction of the second bonding material. Consequently, it becomes possible to sufficiently suppress a decrease in an image quality due to a change in temperature.

At least one of the first bonding material or the second bonding material may be a photocurable adhesive.

The use of a photocurable adhesive makes it possible to reduce the time necessary for the process of assembling the image-capturing apparatus.

Due to thermal expansion and contraction of the first bonding material, the lens holding section may be moved in a direction substantially parallel to an optical axis of the lens section.

It becomes possible to adjust, using the first bonding material, the amount of movement or the like of the lens holding section due to a change in temperature, and thus to sufficiently suppress, for example, an impact of thermal expansion and contraction.

The base body may include an outer peripheral portion that has a cylindrical shape and extends in the direction substantially parallel to the optical axis. In this case, the lens holding section may be inserted into the outer peripheral portion.

This makes it possible to prevent the optical axis from being inclined due to, for example, thermal expansion and contraction. Consequently, it becomes possible to suppress a decrease in an image quality due to a change in temperature.

The outer peripheral portion may include at least one slit portion that is formed in the direction substantially parallel to the optical axis. In this case, the lens holding section may include at least one rib portion that is inserted into the at least one slit portion.

The use of the slit portion and the rib portion makes it possible to align the base body and the lens holding section with a high degree of accuracy, and this results in improving the accuracy in assembling the image-capturing apparatus.

The at least one slit portion may include a first end and a second end, the first end being situated on an insertion side into which the at least one rib portion is inserted, the second end being situated on a side opposite to a side of the first end. In this case, the first surface portion may be arranged in the second end of the at least one slit portion. Further, the second surface portion may be arranged in a tip portion of the at least one rib portion that is situated on a side inserted into the at least one slit portion.

This makes it possible to easily perform filling of the first bonding material, and to reduce the time necessary for the process of assembling the image-capturing apparatus.

The lens section may include at least one lens.

This results in improving the accuracy in image formation performed by the lens section, and it becomes possible to capture a sufficiently-high-quality image.

The image-capturing apparatus may be configured as an in-vehicle device.

This makes it possible to provide an in-vehicle device that is capable of suppressing a decrease in an image quality due to a change in temperature and capturing a high-quality image.

Advantageous Effects of Invention

As described above, the present technology makes it possible to suppress a decrease in an image quality due to a change in temperature and to capture a high-quality image. Note that the effect described here is not necessarily limitative and may be any effect described in the present disclosure.

MODE(S) FOR CARRYING OUT THE INVENTION

Embodiments according to the present technology will now be described below with reference to the drawings.

First Embodiment

Figure 1:
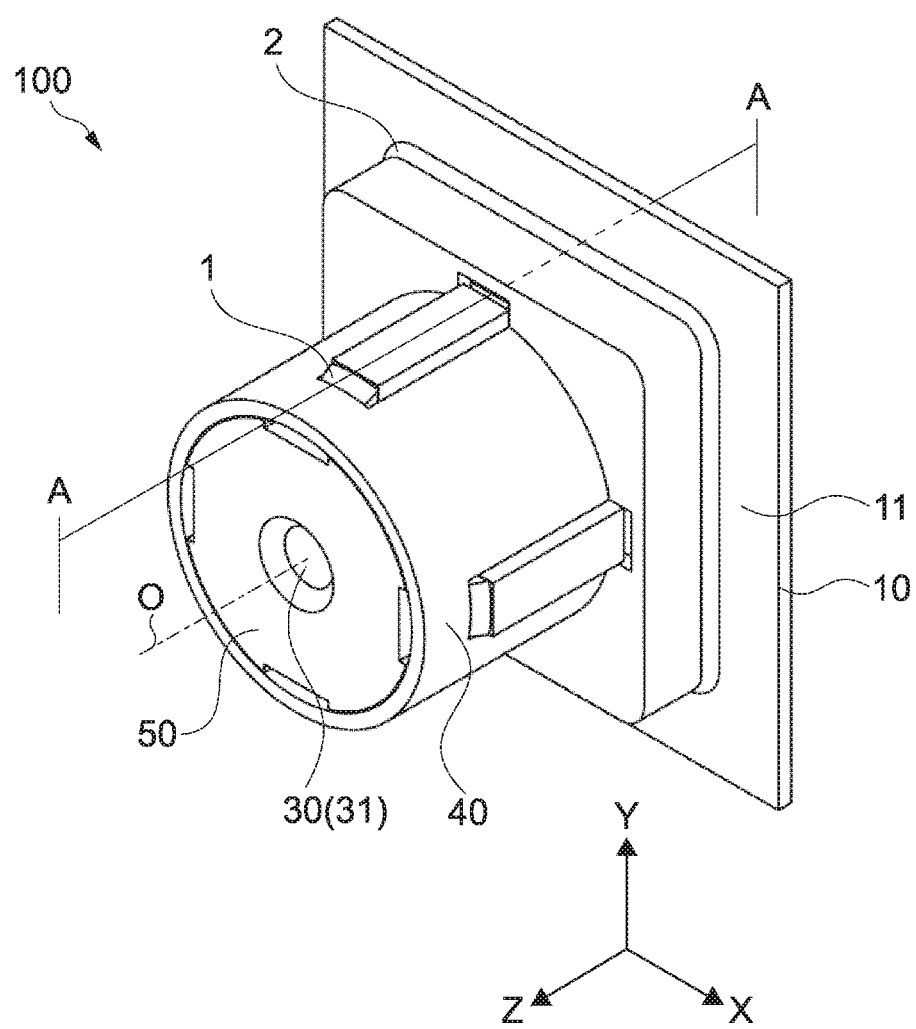
FIG. 1 is a perspective view of an example of a configuration of an image-capturing apparatus according to a first embodiment of the present technology.
Figure 2:
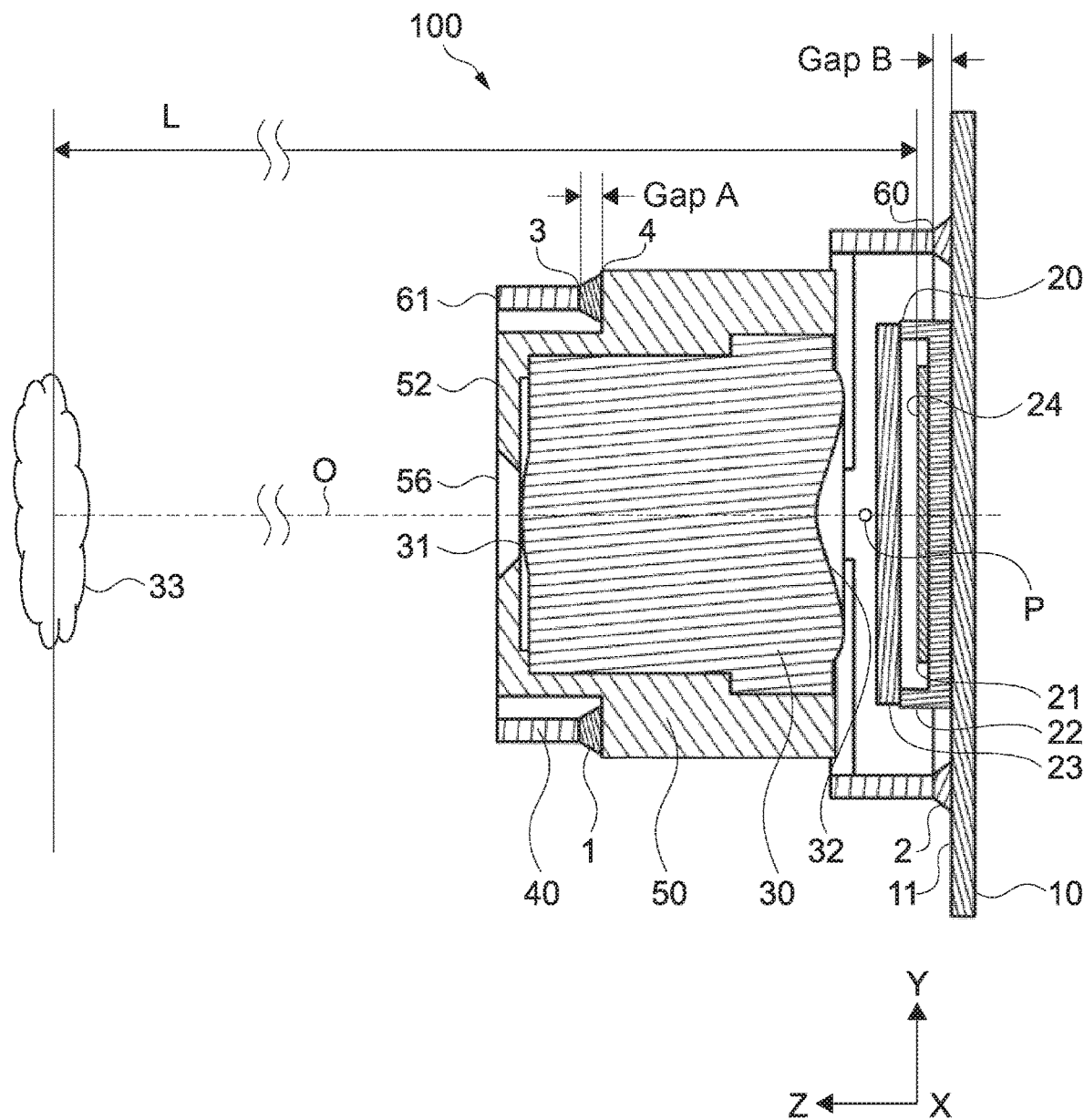
FIG. 2 is a cross-sectional view of the image-capturing apparatus taken along line A-A of FIG. 1.

FIG. 1 is a perspective view of an example of a configuration of an image-capturing apparatus according to a first embodiment of the present technology. FIG. 2 is a cross-sectional view of an image-capturing apparatus 100 taken along line A-A of FIG. 1. For example, the image-capturing apparatus 100 is configured as an in-vehicle device that is installed in a vehicle such as an automobile, and is used for, for example, an image sensor or a drive recorder that monitors a region surrounding the vehicle. The present technology is also applicable to the image-capturing apparatus 100 used for other applications.

The image-capturing apparatus 100 includes a base plate 10, an image-capturing unit 20, a lens unit 30, an external lens tube 40, and an internal lens tube 50. The image-capturing apparatus 100 further includes a lens tube bonding material 1 and a base plate bonding material 2.

The base plate 10 has a plate shape, and includes a substantially rectangular arrangement surface 11. As illustrated in FIG. 2, the image-capturing unit 20 and the external lens tube 40 are arranged on the arrangement surface 11. Note that the external lens tube 40 is connected to the arrangement surface 11 through the base plate bonding material 2. This point will be described in detail later. Further, a wire or the like that is connected to a controller (not illustrated) or the like that controls the image-capturing apparatus 100 is provided to the base plate 10 as appropriate.

In the descriptions of the present embodiment, the side of the arrangement surface 11 of the base plate 10 is a front side of the image-capturing apparatus 100 and the opposite side is a rear side of the image-capturing apparatus 100. Thus, a direction orthogonal to the arrangement surface 11 is a front-rear direction of the image-capturing apparatus 100. In the example illustrated in FIG. 1, an XYZ coordinate is set such that the front-rear direction of the image-capturing apparatus 100 is a Z direction. In other words, a plane direction of the arrangement surface 11 is an XY plane direction.

Figure 3:
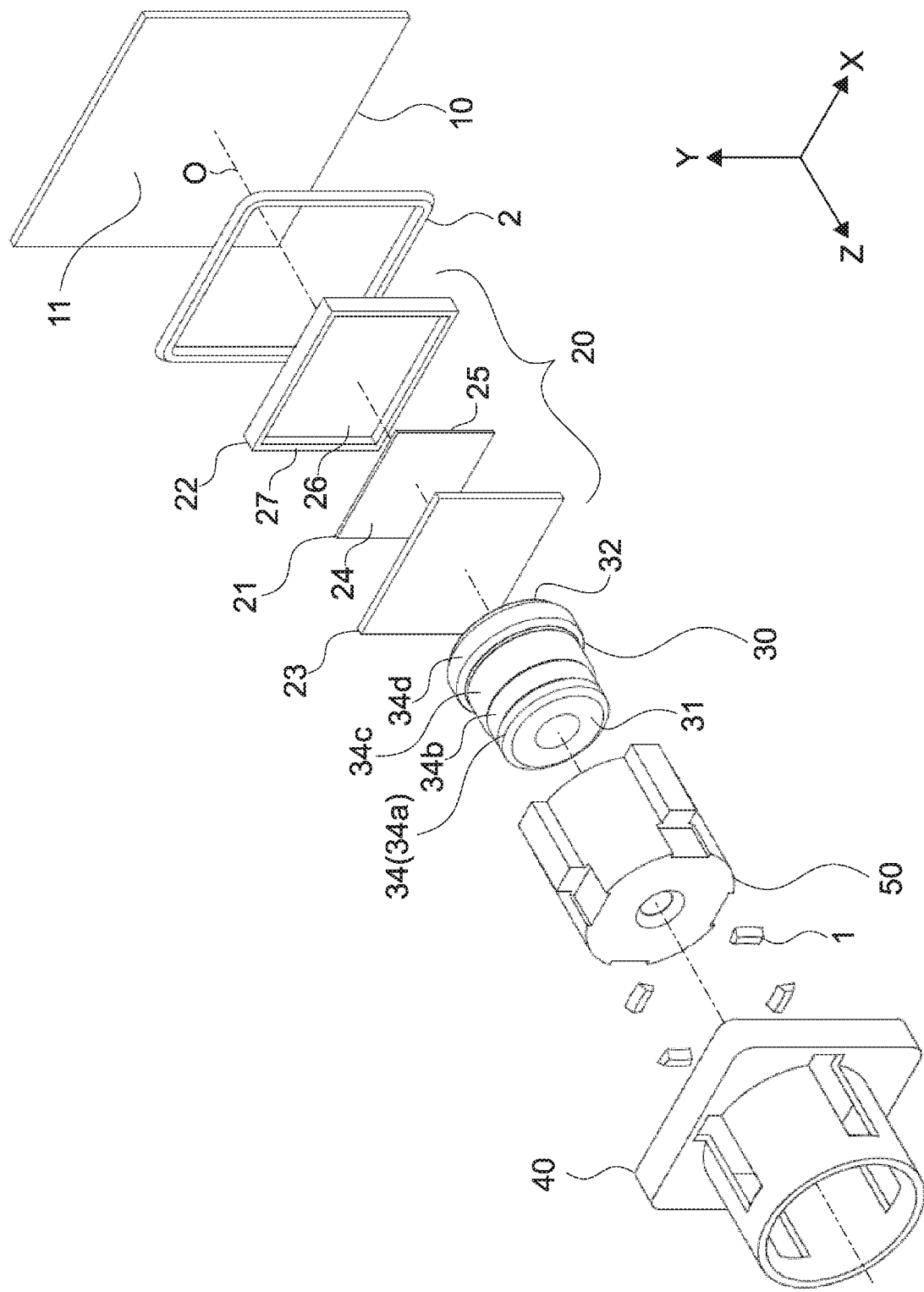
FIG. 3 is an exploded perspective view of the image-capturing apparatus illustrated in FIG. 1.

FIG. 3 is an exploded perspective view of the image-capturing apparatus 100 illustrated in FIG. 1. As illustrated in FIG. 3, the image-capturing unit 20 includes an imaging element 21, a package base plate 22, and a transmissive cover 23.

The imaging element 21 has a plate shape, and includes a forwardly oriented light reception surface 24, and a back surface 25 that is situated on a side opposite to the side of the light reception surface 24. The imaging element 21 detects light that enters each position on the light reception surface 24, and generates an image signal that makes up an image. Further, an electrode (of which an illustration is omitted) or the like used to output the image signal is provided to the imaging element 21 as appropriate.

An image sensor such as a CCD sensor or a complementary metal-oxide semiconductor (CMOS) sensor is used as the imaging element 21. Of course, other types of sensors or the like may be used. The type, the resolution, and the like of the imaging element 21 are not limited, and, for example, the imaging element 21 depending on, for example, the application of the image-capturing apparatus 100 may be used as appropriate.

The package base plate 22 is arranged behind the imaging element 21. The package base plate 22 includes a forwardly oriented arrangement surface 26 and a sidewall 27 that protrudes forward to surround the peripheral edge of the arrangement surface 11. The back surface 25 of the imaging element 21 is connected to the arrangement surface 11 of the package base plate 22. Further, a signal wire (of which an illustration is omitted) for the imaging element 21 is provided to the package base plate 22. For example, the electrode of the imaging element 21 and the signal wire are electrically connected to each other by, for example, bonding wiring. An image signal that is generated by the imaging element 21 is output through the signal wire. Note that the configuration is not limited to using the package base plate 22, and, for example, a configuration (bare implementation) or the like in which a sensor chip that is the imaging element 21 is directly implemented on the base plate may be used. Further, any other configurations for implementing the imaging element 21 may be used.

The transmissive cover 23 has a plate shape, and is arranged ahead of the imaging element 21. The transmissive cover 23 is connected to the sidewall 27 of the package base plate 22 to seal the imaging element 21. The transmissive cover 23 is made of transmissive material through which light is transmitted. Thus, light transmitted through the transmissive cover 23 enters the light reception surface 24 of the imaging element 21. A transparent glass plate or the like is typically used as the transmissive cover 23. The material of the transmissive cover 23 is not limited, and any transmissive materials such as crystal and acrylic may be used.

Figure 5:
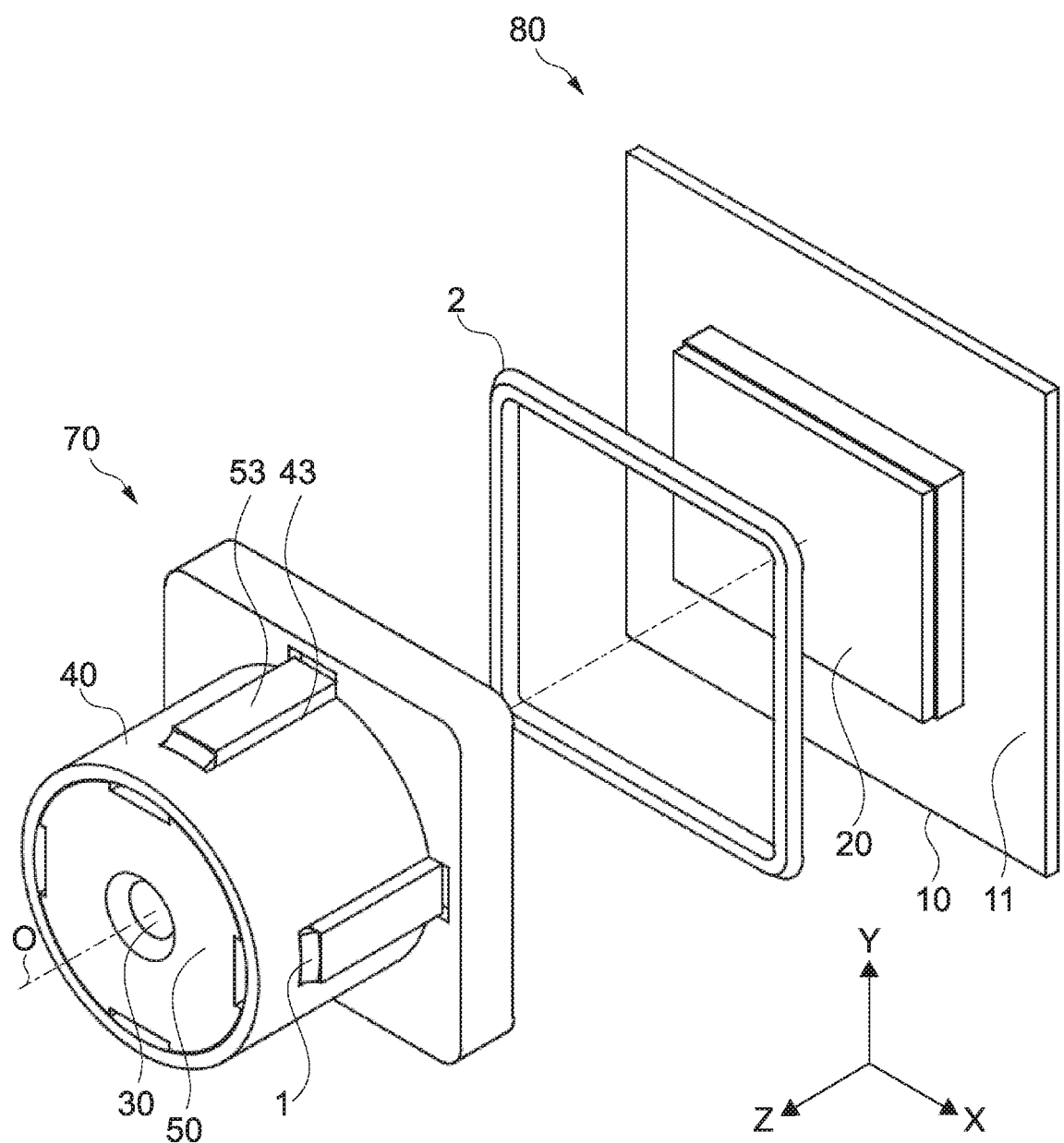
FIG. 5 is a perspective view illustrating an example of the process of assembling the image-capturing apparatus.

The image-capturing unit 20 having accommodated therein the imaging element 21 is arranged on the arrangement surface 11 of the base plate 10 in a state in which the transmissive cover 23 (the light reception surface 24 of the imaging element 21) is forwardly oriented (refer to FIG. 5). As described above, in the present embodiment, the imaging element 21 is packaged in the image-capturing unit 20 to be implemented on the base plate 10. The packaging of the imaging element 21 makes it possible to protect the light reception surface 24 of the imaging element 21 and to prevent bonding wiring or the like from being disconnected. Further, it becomes easy to handle the imaging element 21, and it is possible to improve the operation efficiency in the process of assembling.

As illustrated in FIG. 2, the lens unit 30 includes an incident surface 31 that light from the outside of the image-capturing apparatus 100 enters, and an exit surface 32 that is situated on a side opposite to the side of the incident surface 31. The lens unit 30 is arranged ahead of the imaging element 21 (the image-capturing unit 20) in a state in which the incident surface 31 is forwardly oriented. Thus, light that exits from the exit surface 32 of the lens unit 30 enters the light reception surface 24 of the imaging element 21. In the present embodiment, the lens unit 30 corresponds to a lens section.

The lens unit 30 has an optical axis O and a focal point P on the optical axis O. Here, the focal point P of the lens unit 30 is the focal point P situated in the rear of the lens unit 30, and is, for example, a point at which a collimated beam of light that enters parallel to the optical axis O from the front of the lens unit 30 is collected. FIG. 2 schematically illustrates the focal point P of the lens unit 30. In the following descriptions, the length from the exit surface 32 of the lens unit 30 to the focal point P is referred to as a focal length f of the lens unit 30.

The lens unit 30 controls a light path of light that enters the lens unit 30 and forms an image of the entering light. Typically, an image of the light entering the lens unit 30 is formed in an image-formation plane that is substantially orthogonal to the optical axis O of the lens unit 30. The position of the image-formation plane differs depending on the distance (an image-capturing distance) from a subject of which an image is formed in the image-formation plane and depending on the focal length of the lens unit 30. For example, there is a difference in the position of an image-formation plane in which an image of a subject is formed between the case in which the subject is arranged away from the lens unit 30 and the case in which the subject is arranged near the lens unit 30.

In the present embodiment, the focal length f or the like of the lens unit 30 is set as appropriate such that an image of a subject 33 arranged a specified distance L away from the imaging element 21 can be formed on the imaging element 21. FIG. 2 schematically illustrates the subject 33 situated the specified distance L away from the imaging element 21. An image of the subject 33 situated the specified distance L away from the imaging element 21 is formed in an image-formation plane on the imaging element 21 through the lens unit 30. Note that the specified distance L is, for example, a distance (an image-capturing distance) from the light reception surface 24 of the imaging element 21 to the subject 33. The specified distance L is set according to, for example, the application of the image-capturing apparatus 100, and, for example, a value from a few centimeters to infinity is used as appropriate. Of course, the configuration is not limited to this.

In the image-capturing apparatus 100, the lens unit 30 is held by the internal lens tube 50 and the external lens tube 40 such that the optical axis O of the lens unit 30 is substantially orthogonal to the light reception surface 24 of the imaging element 21. Thus, the optical axis O is substantially parallel to the front-rear direction (the Z direction). FIGS. 1 to 3 each schematically illustrate the optical axis O of the lens unit 30 using a dot-dash line.

As illustrated in FIG. 3, the lens unit 30 includes at least one lens 34. In the example illustrated in FIG. 3, the lens unit 30 includes four lenses 34a to 34d. The four lenses 34a to 34d are arranged in this order from the front of the image-capturing apparatus 100. Thus, a front surface of the lens 34a is the incident surface 31 of the lens unit 30, and a rear surface of the lens 34d is the exit surface 32 of the lens unit 30. Note that illustrations of the shape and the like of each lens 34 are omitted in the cross-sectional view of FIG. 2.

In the present embodiment, a plastic lens is used as the lens 34 included in the lens unit 30. This makes it possible to obtain the light and less expensive image-capturing apparatus 100. The characteristics, the type, the material, the number, and the like of at least one lens 34 are not limited, and, for example, the lens 34 capable of forming a desired image-formation plane may be used as appropriate.

Figure 4:
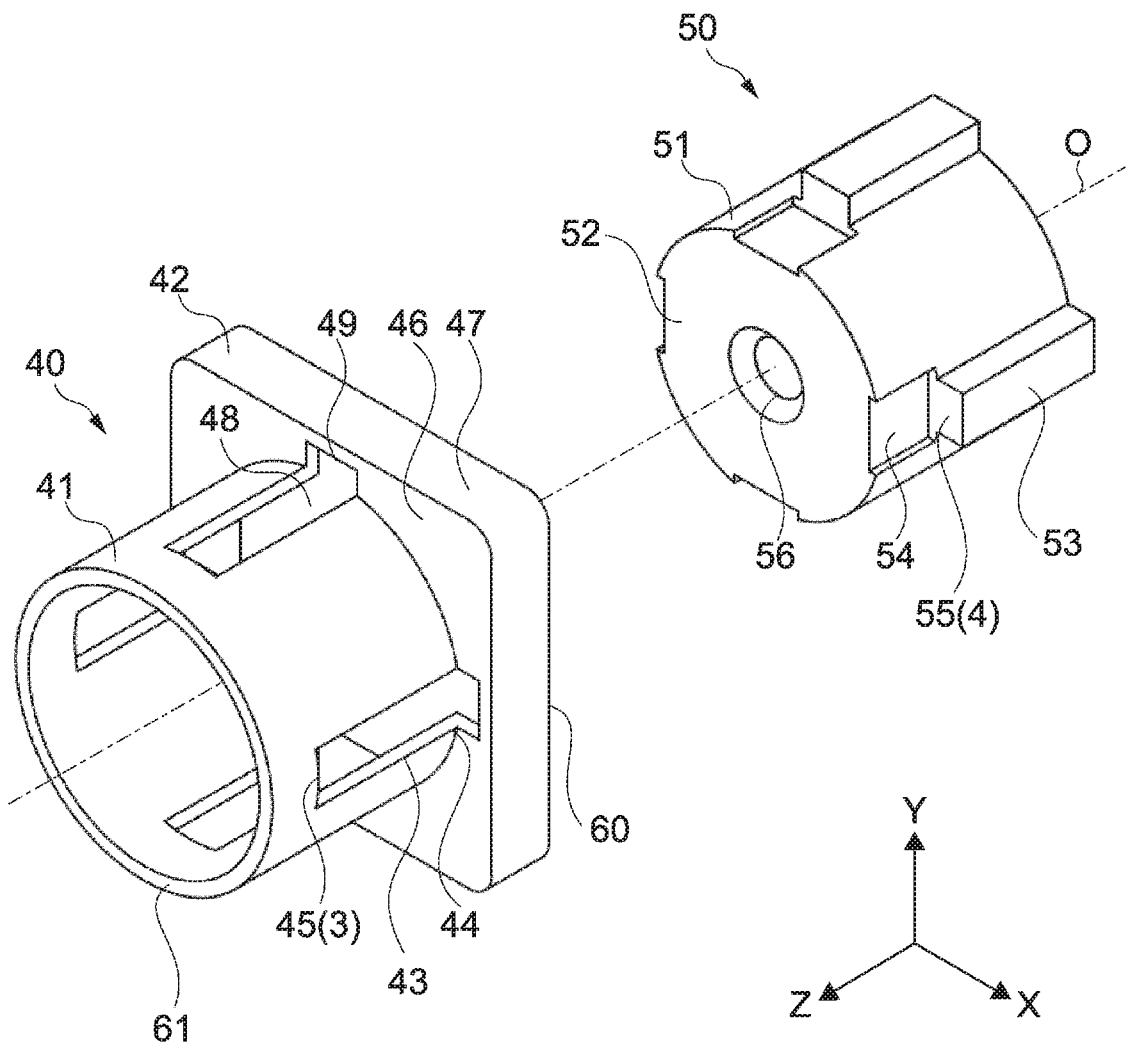
FIG. 4 is a perspective view of an external lens tube and an internal lens tube that are illustrated in FIG. 1.

FIG. 4 is a perspective view of the external lens tube 40 and the internal lens tube 50 that are illustrated in FIG. 1. As illustrated in FIG. 4, the external lens tube 40 includes an outer peripheral portion 41 and a base 42 that is connected to the rear of the outer peripheral portion 41. In the present embodiment, the external lens tube 40 corresponds to a base body.

The outer peripheral portion 41 has a cylindrical shape extending in a direction substantially parallel to the optical axis O. A central axis of the outer peripheral portion 41 (the cylindrical shape) is arranged to substantially coincide with the optical axis O. Further, the outer peripheral portion 41 includes at least one slit 43 that is formed in a direction substantially parallel to the optical axis O. In the present embodiment, four slits 43 are formed in the outer peripheral portion 41. The respective slits 34 are spaced at 90-degree intervals in a circumferential direction of the outer peripheral portion 41. The four slits 43 each have a rectangular shape extending in a direction substantially parallel to the optical axis O, and are each opened to rearward of the outer peripheral portion 41.

A rear end 44 of the slit 43 is on an insertion side into which a rib 53 of the internal lens tube 50 that will be described later is inserted. Further, a first bonding surface 3 is arranged in a front end 45 of the slit 43 to be oriented toward the base plate 10. The first bonding surface 3 is a front end surface of the slit 43, and is typically formed to be substantially parallel to the arrangement surface 11 of the base plate 10 (the XY plane). The configuration is not limited to this, and, for example, the first bonding surface 3 may be formed to be inclined with respect to the base plate 10. In the present embodiment, the first bonding surface 3 corresponds to a first surface portion. Further, the rear end 44 of the slit 43 corresponds to a first end, and the front end 45 of the slit 43 corresponds to a second end.

The base 42 includes a connection surface 46 to which the outer peripheral portion 41 is connected, and a sidewall 47 that is arranged in the rear of the connection surface 46. The connection surface 46 has a substantially rectangular shape, and includes a circular through-hole 48 centered on the optical axis O. The diameter of the through-hole 48 is set to a value similar to the inner diameter of the outer peripheral portion 41. Note that four notches 49 that respectively correspond to the four slits 43 of the outer peripheral portion 41 are formed in the through-hole 48, the notch 49 being used to insert the rib 53 of the internal lens tube 50 into the circular through-hole 48.

The sidewall 47 is arranged to surround the back surface situated behind the connection surface 46, and protrudes rearward. As illustrated in FIG. 2, the length of the protrusion of the sidewall 47 is set to be longer than the width of the image-capturing unit 20 in the front-rear direction. Further, a rear end surface 60 of the sidewall 47 is spaced from the base plate 10. In other words, a space (a gap B) is provided between the base plate 10 and the external lens tube 40. As described above, the external lens tube 40 is spaced from the base plate 10.

The material of the external lens tube 40 is, for example, synthetic resin such as plastic. This makes it possible to easily process and form the external lens tube 40 into a desired shape. Note that the type and the like of synthetic resin are not limited. Further, the external lens tube 40 is not limited to being formed using plastic, and the external lens tube 40 may be made of another material such as metal.

The internal lens tube 50 holds the lens unit 30. Further, the internal lens tube 50 is inserted into the outer peripheral portion 41 of the external lens tube 40. As illustrated in FIG. 4, the internal lens tube 50 includes an inner peripheral portion 51 and a window surface 52 that is connected to the front of the inner peripheral portion 51. In the present embodiment, the internal lens tube 50 corresponds to a lens holding section.

The inner peripheral portion 51 has a cylindrical shape extending in a direction substantially parallel to the optical axis O. A central axis of the inner peripheral portion 51 (the cylindrical shape) is arranged to substantially coincide with the optical axis O. Further, the outer diameter of the inner peripheral portion 51 is set to be smaller than the inner diameter of the outer peripheral portion 41.

The inner peripheral portion 51 includes at least one rib 53 inserted into at least one slit 43 formed in the outer peripheral portion 41. The rib 53 protrudes on an outer periphery of the inner peripheral portion 51 in a direction away from the optical axis O, and is formed in a direction substantially parallel to the optical axis O. As illustrated in FIG. 4, in the present embodiment, four ribs 53 that are respectively inserted into the four slits 43 of the outer peripheral portion 41, are formed. Note that a groove 54 that corresponds to each rib 53 is formed on the outer periphery of the inner peripheral portion 51. The groove 54 is arranged ahead of the rib 53.

A front tip portion 55 of the rib 53 is on a side that is inserted into the slit 43 of the outer peripheral portion 41. A second bonding surface 4 is arranged in the tip portion 55 of the rib 53. The second bonding surface 4 is a front end of the rib 53, and is typically formed to be substantially parallel to the base plate 10. The formation of the second bonding surface 4 is not limited to this, and, for example, the second bonding surface 4 may be formed to be inclined with respect to the base plate 10. In the present embodiment, the second bonding surface 4 corresponds to a second surface portion.

The window surface 52 is a surface that is oriented toward an image-capturing target of the image-capturing apparatus 100, and is arranged in the front of the inner peripheral portion 51. The window surface 52 includes an image-capturing window 56 that light from the image-capturing target enters. The image-capturing window 56 is a circular through-hole centered on the optical axis O. The size, the shape, and the like of the image-capturing window 56 are not limited, and, for example, they may be set discretionarily depending on, for example, the application of the image-capturing apparatus 100.

As described above, the internal lens tube 50 includes the window surface 52 in its front, and has a cylindrical shape that includes an opened rear. Further, a structure such as a groove is provided in the internal lens tube 50 (the inner peripheral portion 51) as appropriate, the structure making it possible to hold each lens 34 such that the optical axis O of the lens unit 30 is maintained. The lens 34 inserted from the rear of the internal lens tube 50 is fixed to the internal lens tube 50 as appropriate using, for example, an adhesive. This makes it possible to properly hold the lens unit 30 using the internal lens tube 50, and thus to deal with the lens unit 30 in an integrated manner.

The material of the internal lens tube 50 is synthetic resin such as plastic. For example, the internal lens tube 50 is formed of a material similar to that of the external lens tube 40. Of course, the configuration is not limited to this, and the internal lens tube 50 and the external lens tube 40 may be formed using different materials.

As illustrated in FIG. 2, the internal lens tube 50 is inserted into the external lens tube 40 in a state in which the internal lens tube 50 holds the lens unit 30. In the image-capturing apparatus 100, the external lens tube 40 and the internal lens tube 50 are arranged such that the position of a front end surface 61 of the outer peripheral portion 41 of the external lens tube 40 and the position of the window surface 52 of the internal lens tube 50 substantially coincide with each other.

Further, the second bonding surface 4 of the internal lens tube 50 is spaced from the first bonding surface 3 of the external lens tube 40. As described above, in the image-capturing apparatus 100, a space (a gap A) is provided between the first bonding surface 3 and the second bonding surface 4. In other words, the external lens tube 40 and the internal lens tube 50 can also be considered to be designed such that the front end 45 of the slit 43 and the front tip portion 55 of the rib 53 do not come into contact with each other.

The lens tube bonding material 1 connects the external lens tube 40 and the internal lens tube 50 by being filled into the space between the first bonding surface 3 and the second bonding surface 4. FIG. 2 schematically illustrates the lens tube bonding material 1 filled into the space between the first bonding surface 3 and the second bonding surface 4. Note that the lens tube bonding material 1 is filled into the space between the first bonding surface 3 and the second bonding surface 4, the first bonding surface 3 being provided to each slit 43 from among four sets of the slit 43 and the rib 53, the second bonding surface 4 being provided to each rib 53 from among the four sets. Thus, the internal lens tube 50 is connected to the external lens tube 40 using the lens tube bonding material 1 filled into four positions.

The base plate bonding material 2 connects the base plate 10 to the external lens tube 40 by being filled into the space between the base plate 10 and the external lens tube 40. FIG. 2 schematically illustrates the base plate bonding material 2 filled into the space between the base plate 10 and the external lens tube 40 (the rear end surface 60 of the base 42). Further, as illustrated in FIGS. 1 and 3, filling of the base plate bonding material 2 is performed such that the entire perimeter of the rear end surface 60 of the base 42 is bonded. This makes it possible to seal the inside of the external lens tube 40 (the base 42), and thus to prevent the lens unit 30 and the image-capturing unit 20 from getting dirty due to, for example, dust.

In the present embodiment, a photocurable adhesive such as a UV adhesive is used as the lens tube bonding material 1 and the base plate bonding material 2. As a specific example, WORLD ROCK 5342 (coefficient of linear expansion: $3.1 \times 10^{-5}/°$ C.) or WORLD ROCK 9301 (coefficient of linear expansion: $9.6 \times 10^{-5}/°$ C.) manufactured by Kyoritsu Chemical & Co., Ltd., or the like can be used. Of course, the photocurable adhesive is not limited to this, and any photocurable adhesive may be used depending on, for example, the accuracy in image capturing.

The use of a photocurable adhesive makes it possible to reduce the time necessary for the process of assembling the image-capturing apparatus 100 and thus to improve the production efficiency. Note that the type and the like of the lens tube bonding material 1 and the base plate bonding material 2 are not limited. For example, one of the lens tube bonding material 1 and the base plate bonding material 2 may be a photocurable adhesive. In this case, any bonding material such as a thermosetting adhesive or an epoxy adhesive may be used as the other of the lens tube bonding material 1 and the base plate bonding material 2. In the present embodiment, the lens tube bonding material 1 corresponds to a first bonding material, and the base plate bonding material 2 corresponds to a second bonding material.

FIG. 5 is a perspective view illustrating an example of the process of assembling the image-capturing apparatus 100. FIG. 5 illustrates a lens tube unit 70 that includes the external lens tube 40, the internal lens tube 50, and the lens unit 30, and a base plate unit 80 that includes the base plate 10 and the image-capturing unit 20. In the process of assembling the image-capturing apparatus 100, first, the lens tube unit 70 and the base plate unit 80 are assembled.

The lens tube unit 70 is assembled by the internal lens tube 50 that holds the lens unit 30 being inserted into the external lens tube 40. Specifically, the internal lens tube 50 (the inner peripheral portion 51) is inserted into the external lens tube 40 (the outer peripheral portion 41) by the four ribs 53 using the four slits 43 as a guide, the four ribs 53 being provided to the inner peripheral portion 51 of the internal lens tube 50, the four slits 43 being provided to the outer peripheral portion 41 of the external lens tube 40. This makes it possible to accurately align the internal lens tube 50 and the external lens tube 40.

The internal lens tube 50 is inserted into the external lens tube 40 such that the position of the window surface 52 of the internal lens tube 50 and the position of the front end surface 61 of the outer peripheral portion 41 of the external lens tube 40 coincide with each other (refer to FIG. 2). Here, a space (the gap A) is created between the first bonding surface 3 situated in the front of the slit 43 and the second bonding surface 4 situated in the front of the rib 53. The lens tube bonding material 1 is filled into the gap A from the outside of the external lens tube 40. Note that, as described with reference to FIG. 4, the groove 54 is formed ahead of the rib 53. Accordingly, it becomes possible to prevent the lens tube bonding material 1 from penetrating between the inner peripheral portion 51 and the outer peripheral portion 41 and thus to properly perform filling of the lens tube bonding material 1.

The lens tube bonding material 1 filled into the gap A is irradiated with light such as ultraviolet light for hardening the lens tube bonding material 1. Accordingly, the internal lens tube 50 and the external lens tube 40 are connected to each other using the lens tube bonding material 1. It is possible to, for example, perform, from the outside, filling of the lens tube bonding material 1 and irradiation of light onto the lens tube bonding material 1 for performing hardening, by setting, to be a bonding portion, a position at which the slit 43 and the rib 53 face each other (a position at which the first bonding surface 3 and the second bonding surface 4 face each other), as described above. Consequently, it becomes possible to easily assemble the lens tube unit 70.

The base plate unit 80 is assembled by connecting the image-capturing unit 20 to the arrangement surface 11 of the base plate 10. Here, a signal wire or the like that outputs an image signal generated by the imaging element 21 is connected to a wire on the base plate 10 as appropriate. As described above, in the base plate unit 80, the imaging element 21 is implemented in a state of being capable of performing operations such as a generation of an image signal.

As illustrated in FIG. 5, the image-capturing apparatus 100 is assembled by connecting the lens tube unit 70 and the base plate unit 80 using the base plate bonding material 2. For example, in a state in which the base plate unit 80 is fixed, the lens tube unit 70 is supported ahead of the base plate unit 80 with a space (the gap B). Here, the lens tube unit 70 is supported to be capable of adjusting the position (such as positions in three directions of a horizontal direction, a left-right direction, and a front-rear direction) and the pose (such as pan, tilt, and roll) of the lens tube unit 70 with respect to the base plate unit 80.

Ahead of the lens tube unit 70, a pattern for alignment is arranged the specified distance L away from the imaging element 21 (the light reception surface 24). A resolution evaluation chart such as Siemens star chart is used as the pattern for alignment. The imaging element 21 images the pattern for alignment through the lens unit 30, and outputs the imaged pattern for alignment in the form of an image signal. The image signal is used to adjust the position and the pose of the lens tube unit 70 (the lens unit 30). The pattern for alignment is not limited, and any pattern may be used.

For example, a focus position is adjusted by moving the lens tube unit 70 in the front-rear direction. For example, the focus position is a position at which the outline of a pattern for alignment is imaged clearly. Further, for example, tilt/shift is adjusted by moving the pose of the lens tube unit 70. For example, according to the resolution or the like in a center portion or an edge portion of an image, the tilt/shift is adjusted such that the image-formation position is substantially the same.

Since the focus position and the tilt/shift are adjusted in a state in which the base plate unit 80 and the lens tube unit 70 are spaced from each other in advance, it is possible to prevent the base plate 10 and the external lens tube 40 from interfering with each other. Thus, it can also be said that the gap B provided between the base plate 10 and the external lens tube 40 serves as a clearance for adjusting an image-formation plane.

When the position and the pose of the lens tube unit 70 are adjusted, the base plate bonding material 2 is filled into the gap B. Then, the base plate bonding material 2 is irradiated with light such as ultraviolet light for hardening the base plate bonding material 2. As described above, the base plate bonding material 2 connects the base plate 10 to the external lens tube 40 such that an image of the subject 33 can be formed on the imaging element 21, the subject 33 being situated the specified distance L away from the imaging element 21. This results in accurately forming an image of the subject 33 on the imaging element 21 and thus in being able to capture a sufficiently-high-quality image. Note that the order and the like of assembly are not limited, and, for example, alignment may be performed in a state in which the side of the base plate 10 or a connection portion on the side of the external lens tube 40 (the rear end surface 60 of the base 42) is coated with the base plate bonding material 2 in advance. This makes it possible to, for example, complete assembly by just performing irradiation of light after alignment.

A case in which the temperature in an operation environment of the image-capturing apparatus 100 has been changed is described with reference to FIG. 2.

Due to a change in the temperature in the operation environment, thermal expansion and contraction occurs in each section of the image-capturing apparatus 100 depending on a coefficient of linear expansion $\alpha$. Here, the coefficient of linear expansion $\alpha$ is a coefficient that represents an amount of a change in the length of an object, the change being caused due to a change in temperature, and the coefficient of linear expansion a is represented by a rate of a change in length that is caused due to temperature per unit length. For example, with respect to the coefficient of linear expansion α, when the temperature of an object of a length L has been changed by ΔT, the amount of change (amount ΔL of thermal expansion and contraction) due to a change in the temperature of the object is represented by $\Delta L = \alpha \times \Delta T \times L$. Descriptions are made below primarily focused on an amount of thermal expansion and contraction in a direction in parallel with the optical axis O.

It is assumed that, for example, the temperature in the operation environment of the image-capturing apparatus 100 has increased. In this case, as illustrated in FIG. 2, the base plate bonding material 2 and the external lens tube 40 respectively expand forward. Consequently, the distance between the first bonding surface 3 of the external lens tube 40 and the arrangement surface 11 of the base plate 10 is increased.

On the other hand, the distance between the first bonding surface 3 and the second bonding surface 4, that is, the width of the gap A is increased due to an expansion of the lens tube bonding material 1, and the internal lens tube 50 is moved rearward. Further, a portion of the internal lens tube 50 that is situated posterior to the second bonding surface 4 expands rearward due to the increase in temperature. This makes it possible to cancel the forward expansions of the base plate bonding material 2 and the external lens tube 40.

Further, when the internal lens tube 50 is moved, the rib 53 of the internal lens tube 50 is moved along the slit of the external lens tube 40. Thus, due to the thermal expansion and contraction of the lens tube bonding material 1, the internal lens tube 50 is moved in a direction substantially parallel to the optical axis O of the lens unit 30. This results in being able to prevent the optical axis O from being inclined due to thermal expansion and contraction caused due to a change in temperature.

As described above, the image-capturing apparatus 100 has a structure that makes it possible to cancel thermal expansion and contraction due to a change in the temperature in the operation environment. The movement amount of the internal lens tube 50 (the lens unit 30) can be adjusted by controlling, as appropriate, the amount of thermal expansion and contraction of the lens tube bonding material 1, that is, the amount of a change in the gap A.

For example, as described using the formula for the amount ΔL of thermal expansion and contraction, an amount ($\Delta L_A$) of a change in the gap A due to a change in temperature can be increased by increasing a coefficient of thermal expansion $\alpha_A$ of the lens tube bonding material 1 or by increasing a width ($L_A$) of the gap A. Conversely, the amount $\Delta L_A$ of a change in the gap A can be decreased by decreasing the coefficient of thermal expansion $\alpha_A$ or the width $L_A$ of the gap A. In the present embodiment, the width $L_A$ of the gap A corresponds to a distance from the first surface portion to the second surface portion.

In the present embodiment, the coefficient of linear expansion $\alpha_A$ of the lens tube bonding material 1 is set such that an amount of shift of an image-formation position is nearly zero, the shift of the image-formation position being caused due to a change in temperature, the image-formation position being a position at which an image of light that enters the lens unit 30 is formed. For example, there is a possibility that the image-formation position of an image formed on the light reception surface 24 of the imaging element 21 will be shifted by, for example, the lens unit 30 moving due to a change in temperature. The coefficient of linear expansion $\alpha_A$ is set such that such an amount of shift of the image-formation position is nearly zero.

As described with reference to FIG. 2, the lens unit 30 is arranged such that an image of the subject 33 is formed on the imaging element 21, the subject 33 being arranged the specified distance L away from the imaging element 21. For example, the coefficient of linear expansion $\alpha_A$ is set such that the amount $\Delta L_A$ of a change in the gap A is substantially the same as the movement amount of the lens unit 30 that is moved due to the thermal expansion and contraction of the base plate bonding material 2 and the thermal expansion and contraction of the external lens tube 40. Accordingly, the amount of shift of an image-formation position is nearly zero, the shift of the image-formation position being caused due to a change in temperature, the image-formation position being a position of an image formed on the light reception surface 24. This results in being able to accurately capture an image of the subject 33 without shifting a focus on the subject 33.

Further, the coefficient of linear expansion $\alpha_A$ of the lens tube bonding material 1 is set according to the width $L_A$ of the gap A. This makes it possible to easily control the amount $\Delta L_A$ of a change in the gap A due to a change in temperature, and to sufficiently suppress, for example, an impact of thermal expansion and contraction due to the change in temperature.

The width $L_A$ of the gap A is set such that an amount of shift of an image-formation position is nearly zero, the shift of the image-formation position being caused due to a change in temperature, the image-formation position being a position at which an image of light that enters the lens unit 30 is formed. This makes it possible to prevent an image-formation position from being shifted due to a change in temperature. Consequently, it becomes possible to suppress a decrease in an image quality due to the change in temperature and to capture a high-quality image.

Further, the width $L_A$ of the gap A is set according to the coefficient of linear expansion $\alpha_A$ of the lens tube bonding material 1. This makes it possible to easily control the amount $\Delta L_A$ of a change in the gap A due to a change in temperature, and to sufficiently suppress, for example, an impact of thermal expansion and contraction due to the change in temperature.

As described above, it is possible to accurately control the amount $\Delta L_A$ of a change in the gap A by setting, as appropriate, at least one of the coefficient of linear expansion $\alpha_A$ of the lens tube bonding material 1 or the width $L_A$ of the gap A. This makes it possible to sufficiently prevent, for example, the occurrence of a shift of focus due to a change in temperature. Consequently, it becomes possible to suppress a decrease in an image quality due to the change in temperature and to capture a high-quality image.

For example, simulation regarding the thermal expansion of the image-capturing apparatus 100 is used as a method for setting the coefficient of linear expansion $\alpha_A$ and the width $L_A$ of the gap A. The simulation regarding the thermal expansion is performed using parameters of a shape, a size, a coefficient of linear expansion, and the like of each of the external lens tube 40, the internal lens tube 50, the base plate bonding material 2, and the lens tube bonding material 1.

In the simulation regarding the thermal expansion, for example, the amount of thermal expansion and contraction of the external lens tube 40 and the amount of thermal expansion and contraction of the internal lens tube 50 are calculated. Further, the amount of thermal expansion and contraction of the base plate bonding material 2 is calculated using a coefficient of linear expansion $\alpha_B$ of the base plate bonding material 2. A movement amount of the internal lens tube 50 that is necessary for preventing a shift of an image-formation position, is estimated using the respective calculated amounts of thermal expansion and contraction. The coefficient of linear expansion $\alpha_A$ and the width $L_A$ of the gap A are set such that the necessary movement amount of the internal lens tube 50 is obtained.

As described above, the coefficient of linear expansion $\alpha_A$ of the lens tube bonding material 1 and the width $L_A$ of the gap A are set according to the amount of thermal expansion and contraction of the external lens tube 40 and the amount of thermal expansion and contraction of the internal lens tube 50. This makes it possible to suppress, for example, an impact due to the thermal expansion and contraction of the external lens tube 40 and the thermal expansion and contraction of the internal lens tube 50 that are caused due to a change in temperature.

Further, the coefficient of linear expansion $\alpha_A$ of the lens tube bonding material 1 and the width $L_A$ of the gap A are set according to the coefficient of linear expansion of the base plate bonding material 2. Thus, even if the distance between the external lens tube 40 and the base plate 10 has been changed due to the thermal expansion and contraction of the base plate bonding material 2, it is possible to sufficiently prevent a shift of an image-formation position. This makes it possible to suppress, for example, an impact due to the thermal expansion and contraction of the base plate bonding material 2 that is caused due to a change in temperature, and to capture a very-high-quality image.

Note that there is a possibility that, due to a change in the temperature in a usage environment of the image-capturing apparatus 100, the refractive index, the shape, and the like of a lens included in the lens unit 30 will be changed and thus the characteristics of the focal length f and the like of the lens unit 30 will be changed. In the present embodiment, the amount of movement of the internal lens tube 50 that is caused due to a change in temperature is set such that a shift of an image-formation position that is caused due to such a change in the characteristics of the lens unit 30, is prevented.

For example, in the simulation, the amount of a change in the focal length f of the lens unit 30 that is caused due to a change in temperature, is calculated, and the amount of shift of an image-formation position that is caused due to the change in the focal length f, is estimated. For example, a movement amount of the internal lens tube 50 that is necessary for preventing a shift of an image-formation position is estimated using an amount of shift of the image-formation position that is caused due to the change in the focal length f, in addition to using an amount of shift of the image-formation position that is calculated from the above-described respective amounts of thermal expansion and contraction of the external lens tube 40, the internal lens tube 50, and the base plate bonding material 2. Then, the coefficient of linear expansion $\alpha_A$ and the width $L_A$ of the gap A are set such that the movement amount of the internal lens tube 50 is obtained.

As described above, in the present embodiment, the coefficient of linear expansion $\alpha_A$ of the lens tube bonding material 1 and the width $L_A$ of the gap A are set according to a change in the focal length f of the lens unit 30 that is caused due to a change in temperature. This makes it possible to suppress, for example, an impact due to a change in the focal length f of the lens unit 30 that is caused due to the change in temperature. Consequently, it becomes possible to sufficiently suppress a decrease in an image quality due to the change in temperature and to capture a very-high-quality image.

As described above, in the image-capturing apparatus 100 according to the present embodiment, the first bonding surface 3 of the external lens tube 40 connected to the base plate 10 and the second bonding surface 4 of the internal lens tube 50 that holds the lens unit 30 are spaced from each other. Then, the lens tube bonding material 1 is filled into the space between the first bonding surface 3 and the second bonding surface 4 so that the external lens tube 40 and the internal lens tube 50 are connected to each other. Accordingly, even if there is a change in temperature, it is possible to suppress an impact of the thermal expansion and contraction of, for example, the external lens tube 40 using the thermal expansion and contraction of the lens tube bonding material 1. Consequently, it becomes possible to suppress a decrease in an image quality due to the change in temperature and to capture a high-quality image.

Examples of a method for preventing a positional shift of a lens due to a change in temperature include a method that includes bringing an interior lens tube and an exterior lens tube into contact with each other such that the thermal expansion and contraction of the interior lens tube and the thermal expansion and contraction of the exterior lens tube are mutually canceled, the interior lens tube being a lens tube to which a lens is fixed, the exterior lens tube being situated outside of the interior lens tube; and connecting the interior lens tube and the exterior lens tube. In this method, a lens is moved according to an amount of thermal expansion and contraction of the interior lens tube in a direction in which the thermal expansion and contraction of the exterior lens tube is canceled. Thus, for example, when a movement amount of a lens is increased or decreased, there is a need to change the length and the material of the interior lens tube. Therefore, there may be a difficulty in, for example, adjusting the position of a lens in detail.

In the image-capturing apparatus 100 according to the present embodiment, the external lens tube 40 and the internal lens tube 50 are connected to each other using the lens tube bonding material 1 filled into the gap A between the first bonding surface 3 of the external lens tube 40 and the second bonding surface 4 of the internal lens tube 50. This makes it possible to adjust the movement amount of the internal lens tube 50 as appropriate using the thermal expansion and contraction of the lens tube bonding material 1. This results in being able to accurately control the movement amount of the internal lens tube 50, and to sufficiently suppress a decrease in an image quality due to a change in temperature.

It is possible to easily adjust the amount of thermal expansion and contraction of the lens tube bonding material 1 (the amount $\Delta L_A$ of a change in the gap A), that is, the movement amount of the internal lens tube 50 by setting the coefficient of linear expansion $\alpha_A$ of the lens tube bonding material 1 and the width $L_A$ of the gap A. This makes it possible to easily correct, for example, a shift of an image-formation position due to a positional shift of the lens unit 30 or due to a change in the focal length f of the lens unit 30, and thus to flexibly cope with, for example, a change in design.

In the present embodiment, the base plate 10 and the external lens tube 40 are connected to each other using the base plate bonding material 2 filled into the gap B between the base plate 10 and the external lens tube 40. As described above, the provision of the gap B makes it possible to accurately adjust the position and the pose of the lens unit 30 with respect to the imaging element 21. Accordingly, it becomes possible to accurately arrange the lens unit 30 even with respect to an imaging element with a large number of pixels for which a high level of focus adjustment is necessary.

Further, it is possible to prevent the occurrence of an impact due to the thermal expansion and contraction of the base plate bonding material 2 by setting the coefficient of linear expansion $\alpha_A$ of the lens tube bonding material 1 and the width $L_A$ of the gap A as appropriate. For example, even if a photocurable adhesive or the like of a high coefficient of linear expansion is used as a base plate bonding material, it is possible to sufficiently suppress an impact due to thermal expansion and contraction. This results in reducing the tact time necessary for the process of bonding. Further, there is no need to use a thermosetting adhesive or the like of a low coefficient of linear expansion, and this makes it possible to omit the process of thermal hardening. Consequently, it is possible to reduce production costs and to improve the production efficiency.

Second Embodiment

An image-capturing apparatus according to a second embodiment of the present technology is described. In the following descriptions, descriptions of a configuration and an operation similar to those of the image-capturing apparatus 100 of the embodiment described above are omitted or simplified.

Figure 6:
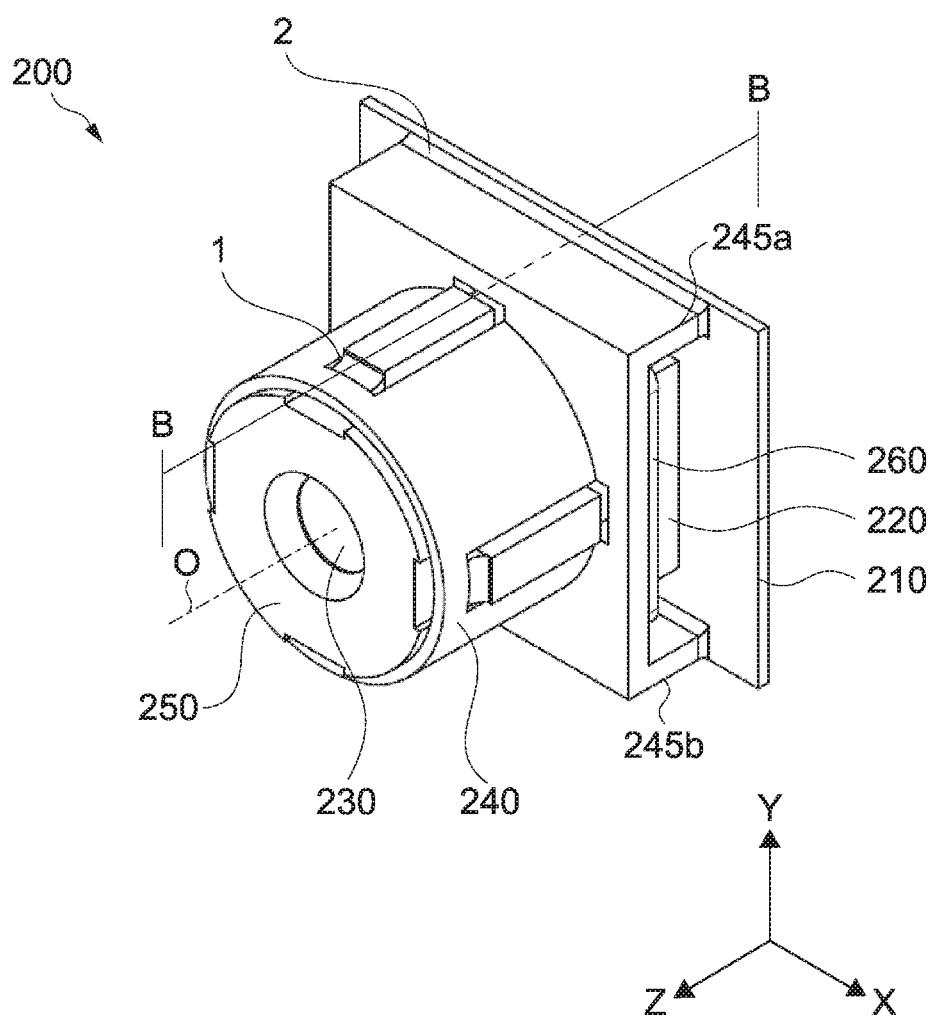
FIG. 6 is a perspective view of an example of a configuration of an image-capturing apparatus according to a second embodiment.
Figure 7:
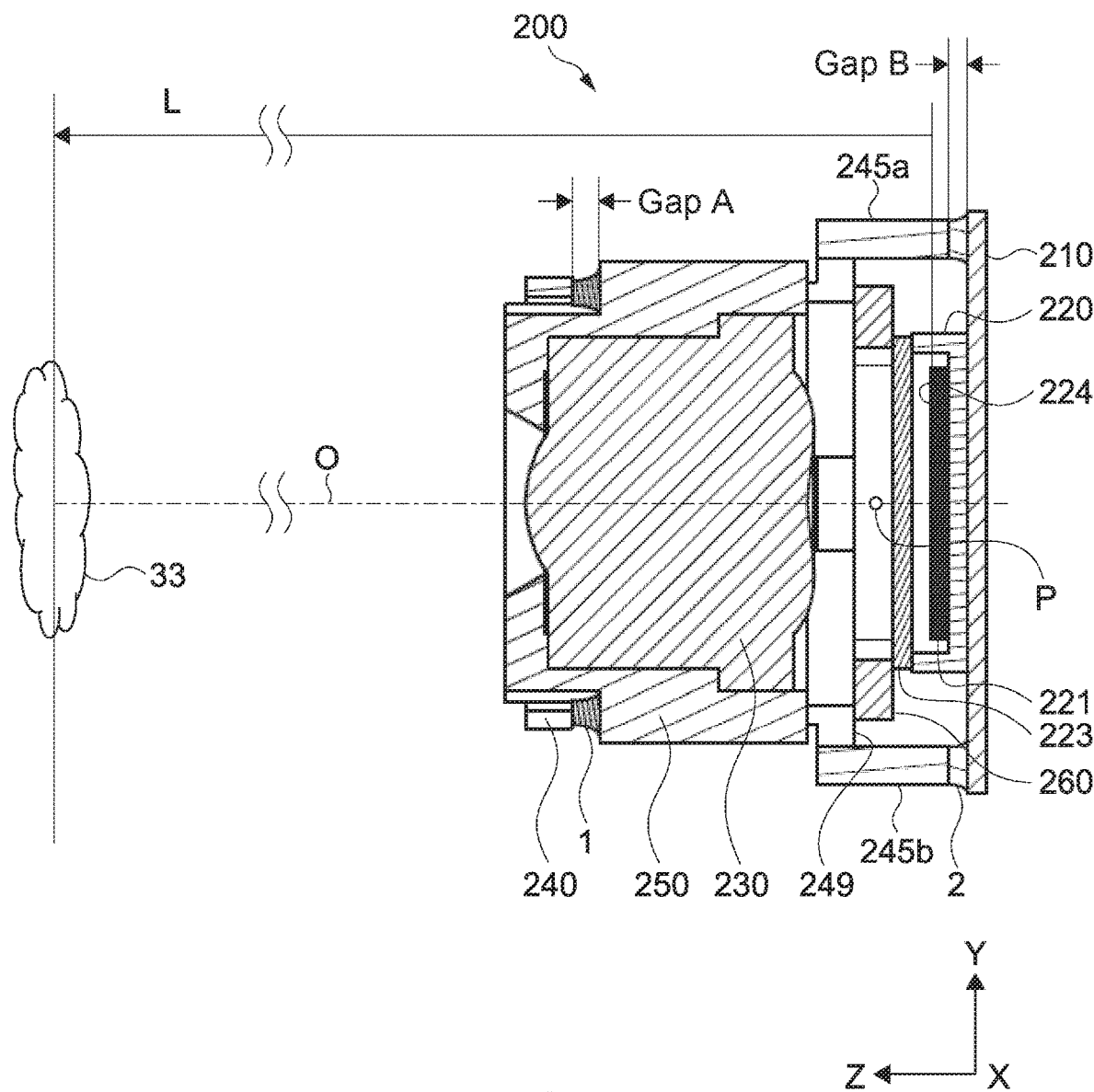
FIG. 7 is a cross-sectional view of the image-capturing apparatus taken along line B-B of FIG. 6.
Figure 8:
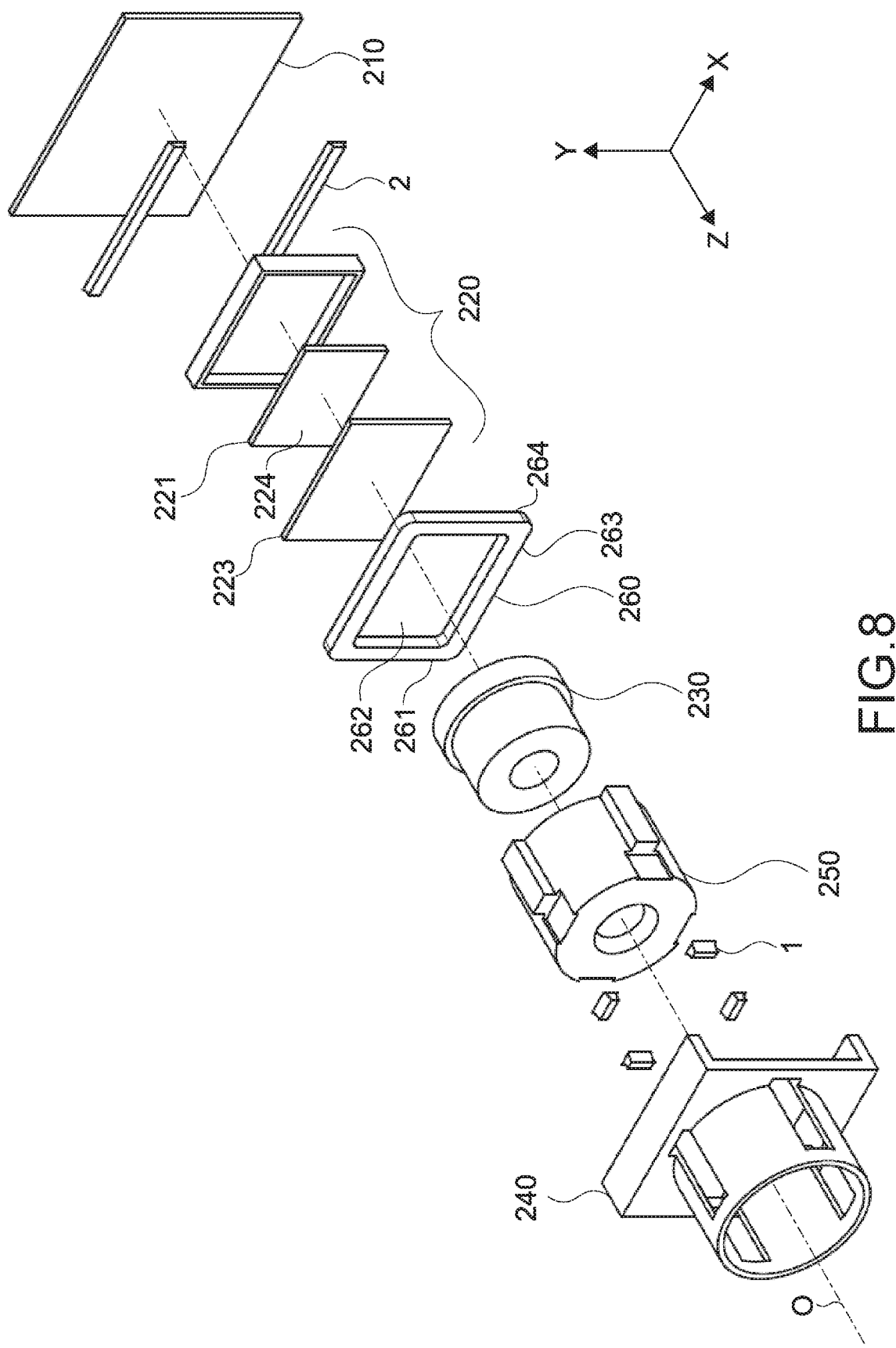
FIG. 8 is an exploded perspective view of the image-capturing apparatus illustrated in FIG. 6.

FIG. 6 is a perspective view of an example of a configuration of an image-capturing apparatus 200 according to the second embodiment. FIG. 7 is a cross-sectional view of the image-capturing apparatus 200 taken along line B-B of FIG. 6. FIG. 8 is an exploded perspective view of the image-capturing apparatus 200 illustrated in FIG. 6. The image-capturing apparatus 200 includes a base plate 210, an image-capturing unit 220 (an imaging element 221) that is implemented on the base plate 210, and a lens unit 230 that forms an image of the subject 33 on the imaging element 221. The image-capturing apparatus 200 further includes an external lens tube 240, an internal lens tube 250, and a seal member 260.

As illustrated in FIG. 6, the external lens tube 240 includes a pair of legs (a first leg 245a and a second leg 245b) used to connect the external lens tube 240 and the base plate 210. In the image-capturing apparatus 200, the legs of the external lens tube 240 are connected to the base plate 210 through the base plate bonding material 2. Note that, as illustrated in FIG. 2, the image-capturing unit 220 (an imager package) having substantially the same size as the diameter of the lens unit 230 is used in the image-capturing apparatus 200.

Figure 9:
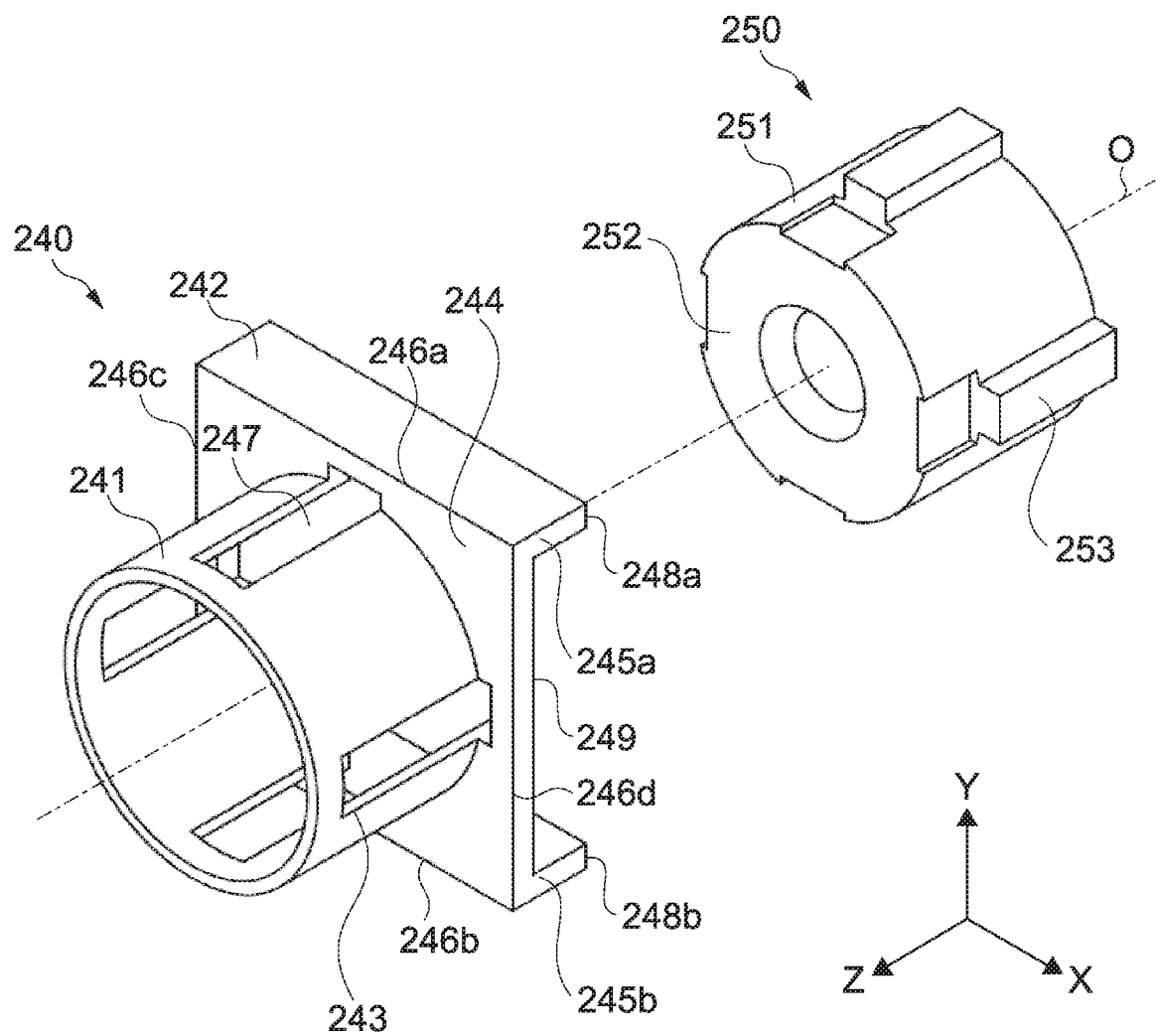
FIG. 9 is a perspective view of an external lens tube and an internal lens tube that are illustrated in FIG. 6.

FIG. 9 is a perspective view of the external lens tube 240 and the internal lens tube 250 that are illustrated in FIG. 6. As illustrated in FIG. 9, the external lens tube 240 includes an outer peripheral portion 241 and a base 242 that is connected to the rear of the outer peripheral portion 241. The outer peripheral portion 241 has a cylindrical shape extending in a direction substantially parallel to the optical axis O, and includes four slits 243 that are spaced at 90-degree intervals in a circumferential direction of the outer peripheral portion 241.

The base 242 includes a connection surface 244 that is connected to the outer peripheral portion 241, the first leg 245a, and the second leg 245b. The connection surface 244 has a rectangular shape, and includes an upper side 246a and a lower side 246b that are parallel to a left-right direction (an X direction), and a left side 246c and a right side 246d that are parallel to an up-down direction (a Y direction). Note that a through-hole 247 used to insert the internal lens tube 250 into the outer peripheral portion 241 is provided on the connection surface 244 as appropriate.

The first leg 245a extends along the upper side 246a and protrudes to rearward of the connection surface 244. The second leg 245b extends along the lower side 246b and protrudes to rearward of the connection surface 244. The length of the protrusion of the first leg 245a and the length of the protrusion of the second leg 245b are set to be the same as each other. Note that a rear end surface 248a of the first leg 245a and a rear end surface 248b of the second leg 245b are surfaces that are connected to the base plate 210 through the base plate bonding material 2.

The internal lens tube 250 holds the lens unit 230, and is inserted into the outer peripheral portion 241 of the external lens tube 240. The internal lens tube 250 includes an inner peripheral portion 251 and a window surface 252 that is arranged in the front of the inner peripheral portion 251, and has a cylindrical shape that includes an opened rear. Four ribs 253 that are respectively inserted into the four slits 243 of the external lens tube 240 (the outer peripheral portion 241), are provided on the outer periphery of the inner peripheral portion 251.

Note that, as illustrated in FIG. 7, each rib 253 is spaced from the front of a corresponding slit 243 with a specified space (the gap A). The lens tube bonding material 1 is filled into the gap A so that the external lens tube 240 and the internal lens tube 250 are connected to each other. This results in a lens tube unit 270 (refer to FIG. 10) being assembled.

As illustrated in FIG. 8, the seal member 260 includes a peripheral edge 261 that has a substantially rectangular outer shape as viewed from the front-rear direction, and a substantially rectangular opening 262 that is surrounded by the peripheral edge 261. In other words, the seal member 260 has a substantially rectangular, annular shape. The peripheral edge 261 includes a forwardly oriented front surface 263, and a rear surface 264 that is situated on a side opposite to the side of the front surface 263. The opening 262 is arranged such that the optical axis O passes through the center of the opening 262.

As illustrated in FIG. 7, the seal member 260 is arranged between a back surface 249 situated behind the connection surface 244 of the external lens tube 240 and the image-capturing unit 220. Thus, in the image-capturing apparatus 200, light emitted from the lens unit 230 passes through the opening 262 and enters the image-capturing unit 220. Further, the front surface 263 of the seal member 260 is brought into contact with the back surface 249 situated behind the connection surface 244, and the rear surface 264 of the seal member 260 is brought into contact with a transmissive cover 223 of the image-capturing unit 220.

The seal member 260 is constituted of an elastic member such as rubber. Thus, it is possible to easily seal between the external lens tube 240 (the back surface 249 situated behind the connection surface 244) and the image-capturing unit 220 by placing the seal member 260 between the external lens tube 240 and the image-capturing unit 220. This makes it possible to prevent the lens unit 230 and the image-capturing unit 220 from getting dirty due to, for example, dust. Note that the type and the like of the seal member 260 are not limited, and, for example, any material may be used that makes it possible to seal between the external lens tube 240 and the image-capturing unit 220.

Figure 10:
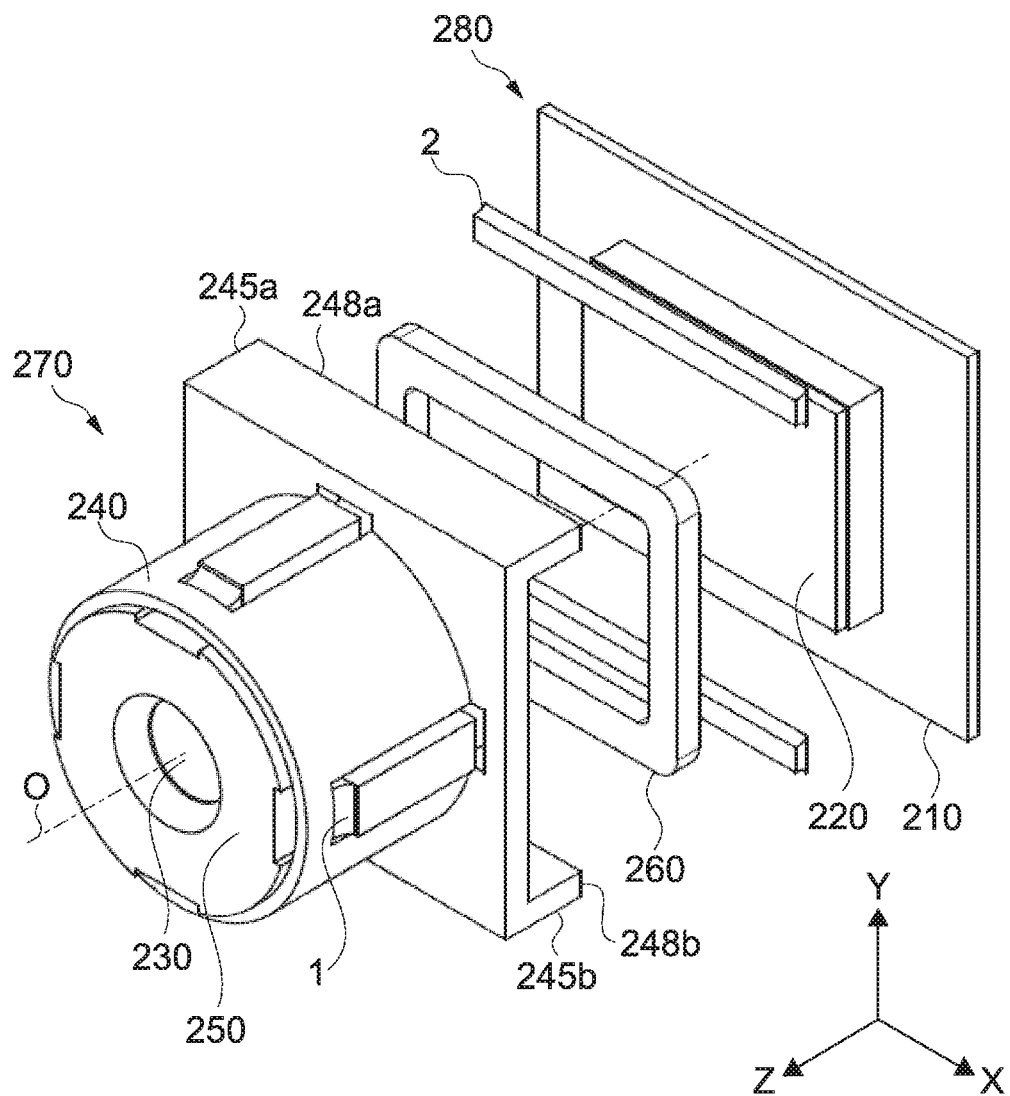
FIG. 10 is a perspective view illustrating an example of the process of assembling the image-capturing apparatus.

FIG. 10 is a perspective view illustrating an example of the process of assembling the image-capturing apparatus 200. As illustrated in FIG. 10, the lens tube unit 270 holding the lens unit 230 and a base plate unit 280 on which the image-capturing unit 220 is implemented are connected to each other using the base plate bonding material 2 so that the image-capturing apparatus 200 is assembled. Here, the seal member 260 is arranged between the external lens tube 240 and the image-capturing unit 220.

In the process of connecting the lens tube unit 270 and the base plate unit 280, alignment such as focus adjustment and tilt/shift adjustment is performed in a state in which the seal member 260 is placed between the lens tube unit 270 and the base plate unit 280. For example, focus, tilt/shift, and the like are adjusted using a method similar to the method described using FIG. 5. In this case, the seal member 260 does not interfere with other members since the seal member 260 is elastic.

The base plate bonding material 2 is filled into a space (the gap B) between the rear end surface 248a of the first leg 245a and the base plate 210. Likewise, the base plate bonding material 2 is filled into a space (the gap B) between the rear end surface 248b of the second leg 245a and the base plate 210. Then, the filled base plate bonding material 2 is irradiated with light for hardening to harden the base plate bonding material 2. Accordingly, the base plate 210 and the external lens tube 240 are connected to each other, and the image-capturing apparatus 200 illustrated in FIG. 6 is assembled. Note that the order and the like of assembly are not limited, and, for example, alignment may be performed in a state in which the side of the base plate 210 or a connection portion on the side of the external lens tube 240 (the rear end surface 248a of the first leg 245a and the rear end surface 248b of the second leg 245b) is coated with the base plate bonding material 2 in advance. This makes it possible to, for example, complete assembly by just performing irradiation of light after alignment.

Even in the case of a structure that holds the lens unit 230 using the legs, as described above, it is possible to adjust, with a high degree of accuracy, the amount of movement of the internal lens tube 250 due to a change in temperature, by setting the coefficient of linear expansion $\alpha_A$ of the lens tube bonding material 1 and the width $L_A$ of the gap A as appropriate. Thus, it becomes possible to accurately correct, for example, a shift of an image-formation position due to a positional shift of the lens unit 230 or due to a change in the focal length f of the lens unit 230. Consequently, it becomes possible to suppress a decrease in an image quality due to the change in temperature and to capture a high-quality image.

In the image-capturing apparatus 200, it is possible to easily form and process the external lens tube 240 by the shape of the external lens tube 240 being provided with a simple structure in which two legs are provided. Further, it is possible to form the lens tube unit 270 in a small size corresponding to the compact image-capturing unit 220, by providing legs such that the image-capturing unit 220 is placed between the legs. This makes it possible to obtain the compact image-capturing apparatus 200.

Other Embodiments

The present technology is not limited to the embodiments described above, and may achieve other various embodiments.

In FIGS. 5 and 10, the process of connecting an external lens tube and a base plate using a base plate bonding material has been described. In this process, the external lens tube is connected to the base plate in a state in which an internal lens tube has been connected to the external lens tube in advance using a lens tube bonding material. The configuration is not limited to this, and the process of connecting an external lens tube and an internal lens tube, and the process of connecting the external lens tube and a base plate may be performed at the same time. In other words, the process of filling and hardening a lens tube bonding material and the process of filling and hardening a base plate bonding material may be performed at the same timing.

For example, an image-capturing apparatus is assembled using, for example, a jig that supports an external lens tube, an internal lens tube, and a base plate independently of one another. In this case, for example, the position and the pose of the internal lens tube with respect to the base plate are adjusted to adjust focus, tilt/shift, and the like of a lens unit. Here, the position and the pose of the external lens tube are adjusted such that the thermal expansion and contraction or the like of a base plate bonding material can be uniformly canceled using the thermal expansion and contraction of a lens tube bonding material. Then, in a state of each section being adjusted, filling of the lens tube bonding material and filling of the base plate bonding material are respectively performed, and the lens tube bonding material and the base plate bonding material are hardened.

Accordingly, for example, even if the interval between the base plate and the external lens tube differs depending on the position (the width of the gap B is unequal), it is possible to uniformly cancel the thermal expansion and contraction of the base plate bonding material using the thermal expansion and contraction of the lens tube bonding material. Consequently, it becomes possible to sufficiently suppress, for example, a shift of an image-formation position due to a change in temperature and to capture a very highly accurate image.

In the embodiments described above, the base plate and the external lens tube are connected to each other by the base plate and the external lens tube being spaced from each other in a state in which the gap B is placed between the base plate and the external lens tube, and by the base plate bonding material being filled into the gap B. The configuration is not limited to this, and the base plate and the external lens tube may be brought into contact with each other to be connected to each other.

Examples of a method that includes bringing a base plate and an external lens tube into contact with each other and connecting the base plate and the external lens tube include a method performed using, for example, a screw clamp or an engagement portion, and a method for connecting a base plate and an external lens tube using a bonding material or the like in a state in which the base plate and the external lens tube are in contact with each other. Even in the case of a structure in which a base plate and an external lens tube are in contact with each other, it is possible to easily prevent, for example, a shift of an image-formation position by setting, as appropriate, a coefficient of linear expansion of a lens tube bonding material filled into the gap A, the width of the gap A, and the like. This makes it possible to capture a highly accurate image even when a change in temperature occurs.

In the examples described above, the external lens tube is configured as the base body according to the present technology. Further, the internal lens tube is configured as the lens holding section according to the present technology. A specific configuration of the base body and the lens holding section is not limited to the examples described above. For example, a configuration in which the lens holding section holding a lens section is arranged outside the base body connected to the base plate, may be used. Further, the gap A is not limited to being configured using a slit and a rib, and, for example, the gap A (a first bonding material) may be provided as appropriate at any position that makes it possible to cancel the thermal expansion and contraction or the like of each section by moving the lens holding section.

In the embodiments described above, the coefficient of linear expansion of a lens tube bonding material and the width of the gap A are set using a result of simulation regarding the thermal expansion of the image-capturing apparatus. For example, it is also possible to set the coefficient of linear expansion of a lens tube bonding material and the width of the gap A according to, for example, a shift of focus that occurs in an actual image-capturing apparatus.

For example, the shift of focus and the like are calculated from images captured by an image-capturing apparatus before and after the occurrence of a change in temperature, and the movement amount of an internal lens tube that is necessary to cancel, for example, the calculated shift of focus is estimated. The coefficient of linear expansion of a lens tube bonding material and the width of the gap A are set such that the estimated movement amount is obtained. As described above, it is possible to easily set an appropriate design value and to take a flexible action without a significant design change. Consequently, it becomes possible to make the process of production significantly more efficient.

The image-capturing apparatuses described above are not limited to being using as in-vehicle devices, and can be used in other various fields. For example, the present technology is applicable to various image-capturing apparatuses such as an action camera used to perform image-capturing outdoors, and a security camera provided at various locations in the living environment. Moreover, an application, an on-board target, a usage environment, and the like of the image-capturing apparatuses are not limited.

At least two of the features of the present technology described above can also be combined. In other words, various features described in the respective embodiments may be optionally combined regardless of the embodiments. Further, the various effects described above are not limitative but are merely illustrative, and other effects may be provided.

Note that the present technology may also take the following configurations.

(1) An image-capturing apparatus including:
a base plate on which an imaging element is implemented;
a base body that includes a first surface portion arranged to be oriented toward the base plate, and is connected to the base plate;
a lens holding section that includes a second surface portion spaced from the first surface portion, and holds a lens section that forms an image of light that enters the lens section; and
a first bonding material that is filled into a space between the first surface portion and the second surface portion to connect the base body and the lens holding section.

(2) The image-capturing apparatus according to (1), in which
a coefficient of linear expansion of the first bonding material is set such that an amount of shift of an image-formation position is nearly zero, the shift of the image-formation position being caused due to a change in temperature, the image-formation position being a position at which an image of the light that enters the lens section is formed.

(3) The image-capturing apparatus according to (1) or (2), in which
a coefficient of linear expansion of the first bonding material is set according to a distance from the first surface portion to the second surface portion.

(4) The image-capturing apparatus according to any one of (1) to (3), in which
a distance from the first surface portion to the second surface portion is set such that an amount of shift of an image-formation position is nearly zero, the shift of the image-formation position being caused due to a change in temperature, the image-formation position being a position at which an image of the light that enters the lens section is formed.

(5) The image-capturing apparatus according to any one of (1) to (4), in which
a distance from the first surface portion to the second surface portion is set according to a coefficient of linear expansion of the first bonding material.

(6) The image-capturing apparatus according to any one of (1) to (5), in which
a coefficient of linear expansion of the first bonding material and a distance from the first surface portion to the second surface portion are set according to an amount of thermal expansion and contraction of the base body and an amount of thermal expansion and contraction of the lens holding section.

(7) The image-capturing apparatus according to any one of (1) to (6), in which
a coefficient of linear expansion of the first bonding material and a distance from the first surface portion to the second surface portion are set according to a change in a focal length of the lens section, the change in the focal length of the lens section being caused due to a change in temperature.

(8) The image-capturing apparatus according to any one of (1) to (7), in which
the base body is spaced from the base plate, and
the image-capturing apparatus further includes a second bonding material that is filled into a space between the base plate and the base body to connect the base plate and the base body.

(9) The image-capturing apparatus according to (8), in which
the second bonding material connects the base plate and the base body such that the lens section is able to form an image of a subject on the imaging element, the subject being situated a specified distance away from the imaging element.

(10) The image-capturing apparatus according to (8) or (9), in which
a coefficient of linear expansion of the first bonding material and a distance from the first surface portion to the second surface portion are set according to a coefficient of linear expansion of the second bonding material.

(11) The image-capturing apparatus according to any one of (8) to (10), in which
at least one of the first bonding material or the second bonding material is a photocurable adhesive.

(12) The image-capturing apparatus according to any one of (1) to (11), in which
due to thermal expansion and contraction of the first bonding material, the lens holding section is moved in a direction substantially parallel to an optical axis of the lens section.

(13) The image-capturing apparatus according to (12), in which
the base body includes an outer peripheral portion that has a cylindrical shape and extends in the direction substantially parallel to the optical axis, and
the lens holding section is inserted into the outer peripheral portion.

(14) The image-capturing apparatus according to (13), in which
the outer peripheral portion includes at least one slit portion that is formed in the direction substantially parallel to the optical axis, and
the lens holding section includes at least one rib portion that is inserted into the at least one slit portion.
(15) The image-capturing apparatus according to (14), in which
the at least one slit portion includes a first end and a second end, the first end being situated on an insertion side into which the at least one rib portion is inserted, the second end being situated on a side opposite to a side of the first end,
the first surface portion is arranged in the second end of the at least one slit portion, and
the second surface portion is arranged in a tip portion of the at least one rib portion that is situated on a side inserted into the at least one slit portion.
(16) The image-capturing apparatus according to any one of (1) to (15), in which
the lens section includes at least one lens.
(17) The image-capturing apparatus according to any one of (1) to (16), in which
the image-capturing apparatus is configured as an in-vehicle device.

REFERENCE SIGNS LIST 1 lens tube bonding material
2 base plate bonding material
3 first bonding surface
4 second bonding surface
10, 210 base plate
20, 220 image-capturing unit
21, 221 imaging element
24, 224 light reception surface
30, 230 lens unit
33 subject
34, 34a to 34d lens
40, 240 external lens tube
41, 241 outer peripheral portion
43, 243 slit
44 rear end
45 front end
50, 250 internal lens tube
51, 251 inner peripheral portion
53, 253 rib
55 tip portion
70, 270 lens tube unit
80, 280 base plate unit
100, 200 image-capturing apparatus

The invention claimed is:

1. An image-capturing apparatus comprising:
a base plate on which an imaging element is implemented;
a base body that includes a first surface portion arranged to be oriented toward the base plate, and the base body being connected to the base plate;
a lens holding section that includes a second surface portion spaced from the first surface portion, and holds a lens section that forms an image of light that enters the lens section; and
a first bonding material that is filled into a space between the first surface portion and the second surface portion to connect the base body and the lens holding section,
wherein the base body is spaced from the base plate, and the image-capturing apparatus further comprises a second bonding material that is filled into a space between the base plate and the base body to connect the base plate and the base body, and
a coefficient of linear expansion of the first bonding material and a distance from the first surface portion to the second surface portion are set according to a coefficient of linear expansion of the second bonding material.

2. The image-capturing apparatus according to claim 1, wherein
a coefficient of linear expansion of the first bonding material is set such that an amount of shift of an image-formation position is nearly zero, the shift of the image-formation position being caused due to a change in temperature, the image-formation position being a position at which an image of the light that enters the lens section is formed.

3. The image-capturing apparatus according to claim 1, wherein
a coefficient of linear expansion of the first bonding material is set according to a distance from the first surface portion to the second surface portion.

4. The image-capturing apparatus according to claim 1, wherein
a distance from the first surface portion to the second surface portion is set such that an amount of shill of an image-formation position is nearly zero, the shift of the image-formation position being caused due to a change in temperature, the image-formation position being a position at which an image of the light that enters the lens section is formed.

5. The image-capturing apparatus according to claim 1, wherein
a distance from the first surface portion to the second surface portion is set according to a coefficient of linear expansion of the first bonding material.

6. The image-capturing apparatus according to claim 1, wherein
a coefficient of linear expansion of the first bonding material and a distance from the first surface portion to the second surface portion are set according to an amount of thermal expansion and contraction of the base body and an amount of thermal expansion and contraction of the lens holding section.

7. The image-capturing apparatus according to claim 1, wherein
a coefficient of linear expansion of the first bonding material and a distance from the first surface portion to the second surface portion are set according to a change in a focal length of the lens section, the change in the focal length of the lens section being caused due to a change in temperature.

8. The image-capturing apparatus according to claim 1, wherein
the second bonding material connects the base plate and the base body such that the lens section is able to form an image of a subject on the imaging element, the subject being situated a specified distance away from the imaging element.

9. The image-capturing apparatus according to claim 1, wherein
at least one of the first bonding material or the second bonding material is a photocurable adhesive.

10. The image-capturing apparatus according to claim 1, wherein due to thermal expansion and contraction of the first bonding material, the lens holding section is moved in a direction substantially parallel to an optical axis of the lens section.

11. The image-capturing apparatus according to claim 10, wherein the base body includes an outer peripheral portion that has a cylindrical shape and extends in the direction substantially parallel to the optical axis, and the lens holding section is inserted into the outer peripheral portion.

12. The image-capturing apparatus according to claim 11, wherein the outer peripheral portion includes at least one slit portion that is formed in the direction substantially parallel to the optical axis, and the lens holding section includes at least one rib portion that is inserted into the at least one slit portion.

13. The image-capturing apparatus according to claim 12, wherein the at least one slit portion includes a first end and a second end, the first end being situated on an insertion side into which the at least one rib portion is inserted, the second end being situated on a side opposite to a side of the first end, the first surface portion is arranged in the second end of the at least one slit portion, and the second surface portion is arranged in a tip portion of the at least one rib portion that is situated on a side inserted into the at least one slit portion.

14. The image-capturing apparatus according to claim 1, wherein the lens section includes at least one lens.

15. The image-capturing apparatus according to claim 1, wherein the image-capturing apparatus is configured as an in-vehicle device.

* * * * *